US011483030B2

(12) United States Patent
Gill et al.

(10) Patent No.: US 11,483,030 B2
(45) Date of Patent: Oct. 25, 2022

(54) POWER DISTRIBUTION SYSTEM FOR 3 PHASE BALANCED LOADS

(71) Applicant: Bose Corporation, Framingham, MA (US)

(72) Inventors: David C. Gill, Lincoln, RI (US); Daniel S. Pearce, Worcester, MA (US)

(73) Assignee: Bose Corporation, Framingham, MA (US)

( * ) Notice: Subject to any disclaimer, the term of this patent is extended or adjusted under 35 U.S.C. 154(b) by 328 days.

(21) Appl. No.: 16/839,269

(22) Filed: Apr. 3, 2020

(65) Prior Publication Data

US 2021/0314026 A1 Oct. 7, 2021

(51) Int. Cl.
*H04B 3/56* (2006.01)
*H04B 3/462* (2015.01)

(52) U.S. Cl.
CPC ............... *H04B 3/56* (2013.01); *H04B 3/462* (2013.01); *H04B 2203/5466* (2013.01)

(58) Field of Classification Search
CPC .. H04B 3/56; H04B 3/462; H04B 2203/5466; H04R 2201/403; H04R 2420/09; H04R 3/12; H04R 27/00; H04R 1/403
See application file for complete search history.

(56) References Cited

U.S. PATENT DOCUMENTS

| 5,046,963 A | 9/1991 | Kelly |
| 2013/0251163 A1 | 9/2013 | Adamson et al. |
| 2013/0322656 A1* | 12/2013 | Adams .................... H04R 1/26 381/351 |

FOREIGN PATENT DOCUMENTS

| CN | 1046433 A | 10/1990 | |
| CN | 109155897 A * | 1/2019 | ............ H03G 3/002 |
| WO | WO-2013138927 A1 * | 9/2013 | ............... H02J 7/00 |

OTHER PUBLICATIONS

International Search Report and the Written Opinion of the International Searching Authority, International Patent Application No. PCT/US2021/025526, pp. 1-12, dated Jul. 16, 2021.

* cited by examiner

*Primary Examiner* — Jean B Corrielus
(74) *Attorney, Agent, or Firm* — Bond, Schoeneck & King, PLLC

(57) ABSTRACT

A power distribution system including a first and second speaker is provided. The first speaker includes (1) a first input receiving a first power signal; (2) a second input receiving a second power signal phase shifted 120 degrees from the first signal; (3) a third input receiving a third power signal phase shifted 120 degrees from both the first and second signal; (4) a first output transmitting the third power signal; (5) a second output transmitting the first power signal; (6) a third output transmitting the second power signal; and (7) a first load coupled to the first and second input. The second speaker includes (1) a first input receiving the third power signal; (2) a second input receiving the first power signal; (3) a third input receiving the second power signal; and (4) a second load coupled to the first and second input.

20 Claims, 10 Drawing Sheets

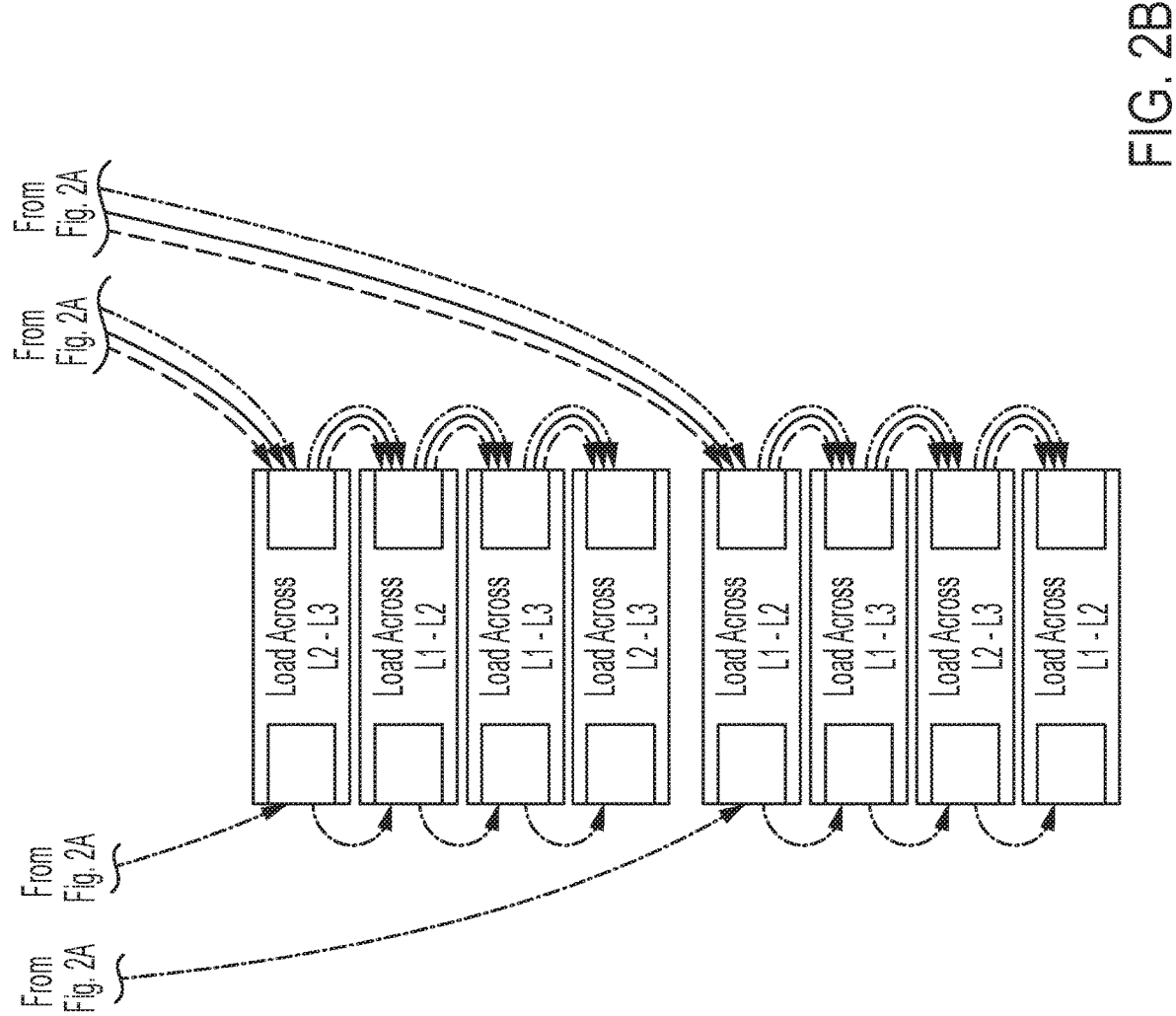

POWER DISTRIBUTION SYSTEM FOR 3 PHASE BALANCED LOADS

BACKGROUND

This disclosure generally relates to systems and methods for a power distribution system providing improved usage of three phase power in sound system applications.

SUMMARY

This disclosure generally relates to systems and methods for a power distribution system providing improved usage of three phase power in sound system applications.

In one aspect, a power distribution system is provided. The power distribution system may include a first powered audio speaker. The first powered audio speaker may include a first input power port. The first input power port may be configured to receive a first distributed power signal. The first distributed power signal may have a first phase.

The first powered audio speaker may include a second input power port. The second input power port may be configured to receive a second distributed power signal. The second distributed power signal may have a second phase. The second phase may be shifted 120 degrees from the first phase.

The first powered audio speaker may include a third input power port. The third input power port may be configured to receive a third distributed power signal. The third distributed power signal may have a third phase. The third phase may be shifted 120 degrees from both the first phase and the second phase.

The first powered audio speaker may include a first output power port. The first output power port may be electrically coupled to the third input power port. The first output power port may be configured to transmit the third distributed power signal.

The first powered audio speaker may include a second output power port. The second output power port may be electrically coupled to the first input power port. The second output power port may be configured to transmit the first distributed power signal.

The first powered audio speaker may include a third output power port. The third output power port may be electrically coupled to the second input power port. The third output power port may be configured to transmit the second distributed power signal.

The first powered audio speaker may include a first load. The first load may be electrically coupled to the first input power port and the second input power port. According to an example, the first load may be an audio transducer.

The power distribution system may further include a second powered audio speaker. The second powered audio speaker may include a first input power port. The first input power port may be electrically coupled to the first output power port of the first powered audio speaker. The first input power port may be configured to receive the third distributed power signal.

The second powered audio speaker may include a second input power port. The second input power port may be electrically coupled to the second output power port of the first powered audio speaker. The second input power port may be configured to receive the first distributed power signal.

The second powered audio speaker may include a third input power port. The third input power port may be electrically coupled to the third output power port of the first powered audio speaker. The third input power port may be configured to receive the second distributed power signal.

The second powered audio speaker may include a second load. The second load may be electrically coupled to the first input power port and the second input power port.

According to an example, the second powered audio speaker may further include a first output power port. The first output power port may be electrically coupled to the third input power port. The first output power port may be configured to transmit the second distributed power signal.

The second powered audio speaker may include a second output power port. The second output power port may be electrically coupled to the first input power port. The second output power port may be configured to transmit the third distributed power signal.

The second powered audio speaker may include a third output power port. The third output power port may be electrically coupled to the second input power port. The third output power port may be configured to transmit the first distributed power signal.

According to an example, the power distribution system may include a third powered audio speaker. The third powered audio speaker may include a first input power port. The first input power port may be electrically coupled to the first output power port of the second powered audio speaker. The first input power port may be configured to receive the second distributed power signal.

The third powered audio speaker may include a second input power port. The second input power port may be electrically coupled to the second output power port of the second powered audio speaker. The second input power port may be configured to receive the third distributed power signal.

The third powered audio speaker may include a third input power port. The third input power port may be electrically coupled to the third output power port of the second powered audio speaker. The third input power port may be configured to receive the first distributed power signal.

The third powered audio speaker may include a third load. The third load may be electrically coupled to the first input power port and the second input power port.

According to an example, the third powered audio speaker may include a first output power port. The first output power port may be electrically coupled to the third input power port. The first output power port may be configured to transmit the first distributed power signal.

The third powered audio speaker may include a second output power port. The second output power port may be electrically coupled to the first input power port. The second output power port may be configured to transmit the second distributed power signal.

The third powered audio speaker may include a third output power port. The third output power port may be electrically coupled to the second input power port. The third output power port may be configured to transmit the third distributed power signal.

According to an example, the power distribution system may include a fourth powered audio speaker. The fourth powered audio speaker may include a first input power port. The first input power port may be electrically coupled to the first output power port of the third powered audio speaker. The first input power port may be configured to receive the first distributed power signal.

The fourth powered audio speaker may include a second input power port. The second input power port may be electrically coupled to the second output power port of the third powered audio speaker. The second input power port may be configured to receive the second distributed power signal.

The fourth powered audio speaker may include a third input power port. The third input power port may be electrically coupled to the third output power port of the third powered audio speaker. The third input power port may be configured to receive the third distributed power signal.

The fourth powered audio speaker may include a fourth load. The fourth load may be electrically coupled to the first input power port and the second input power port.

According to an example, the first powered audio speaker may include an input audio port. The input audio port may be configured to receive an audio signal. The first powered audio speaker may further include an output audio port. The output audio port may be configured to transmit the audio signal.

According to an example, the second powered audio speaker may include an input audio port. The input audio port may be coupled to the output audio port of the first powered audio speaker. The input audio port may be configured to receive the audio signal. The second powered audio speaker may include an output audio port. The output audio port may be configured to transmit the audio signal.

According to an example, the third powered audio speaker may include an input audio port. The input audio port may be coupled to the output audio port of the second powered audio speaker. The input audio port may be configured to receive the audio signal. The third powered audio speaker may include an output audio port configured to transmit the audio signal.

According to an example, the fourth powered audio speaker may include an input audio port. The input audio port may be coupled to the output audio port of the third powered audio speaker. The input audio port may be configured to receive the audio signal.

According to an example, the first powered audio speaker may include an input ground port. The input ground port may be configured to receive a ground signal. The first powered audio speaker may further comprise an output ground port configured to transmit the ground signal.

According to an example, the second powered audio speaker may include an input ground port. The input ground port may be coupled to the output ground port of the first powered audio speaker. The input ground port may be configured to receive the ground signal. The second powered audio speaker may include an output ground port. The output ground port may be configured to transmit the ground signal.

According to an example, the power distribution system may include a power distribution block. The power distribution block may be configured to produce the first, second, and third distributed power signals.

The power distribution block may include a first main input power port. The first main input power port may be configured to receive a first main power signal. The first main power signal may have a first phase.

The power distribution block may include a second main input power port. The second main input power port may be configured to receive a second main power signal. The second main power signal may have a second phase. The second phase may be shifted 120 degrees from the first phase.

The power distribution block may include a third main input power port. The third main input power port may be configured to receive a third main power signal. The third main power signal may have a third phase. The third phase may be shifted 120 degrees from both the first phase and the second phase.

The power distribution block may include a first distributed output power port. The first distributed output power port may be electrically coupled to the first main input power port. The first distributed output power port may be configured to transmit the first distributed power signal to the first input power port of the first powered audio speaker.

The power distribution block may include a second distributed output power port. The second distributed output power port may be electrically coupled to the second main input power port. The second distributed output power port may be configured to transmit the second distributed power signal to the second input power port of the first powered audio speaker.

The power distribution block may include a third distributed output power port. The third distributed output power port may be electrically coupled to the third main input power port. The third distributed output power port may be configured to transmit the third distributed power signal to the third input power port of the first powered audio speaker.

According to an example, the power distribution block may include a fourth distributed output power port. The fourth distributed output power port may be electrically coupled to the third main input power port. The fourth distributed output power port may be configured to transmit the third distributed power signal to a first input power port of a fifth powered audio speaker.

The power distribution block may further include a fifth distributed output power port. The fifth distributed output power port may be electrically coupled to the first main input power port. The fifth distributed output power port may be configured to transmit the first distributed power signal to a second input power port of the fifth powered audio speaker.

The power distribution block may further include a sixth distributed output power port. The sixth distributed output power port may be electrically coupled to the second main input power port. The sixth distributed output power port may be configured to transmit the second distributed power signal to a third input power port of the fifth powered audio speaker.

According to an example, the power distribution block may include a main power circuit breaker. The main power circuit breaker may be electrically coupled to at least one of the first, second, or third main input power ports.

According to an example, the power distribution block may include a distributed power circuit breaker. The distributed power circuit breaker may be electrically coupled to at least one of the first, second, or third distributed output power ports.

According to an example, a main signal current of the first, second, and third main power signals may be greater than a distributed signal current of the first, second, or third distributed power signals.

In another aspect, a method for power distribution is provided. The method may include receiving, by a first input power port of a first powered audio speaker, a first distributed power signal. The first distributed power signal may have a first phase. The method may include receiving, by a second input power port of the first powered audio speaker, a second distributed power signal. The second distributed power signal may have a second phase shifted 120 degrees from the first phase. The method may further include receiving, by a third input power port of the first powered audio speaker, a third distributed power signal. The third distributed power signal may have a third phase shifted 120 degrees from both the first phase and the second phase.

The method may further include transmitting, by a first output power port of the first powered audio speaker, the third distributed power signal. The method may further include transmitting, by a second output power port of the first powered audio speaker, the first distributed power signal. The method may further include transmitting, by a third output power port of the first powered audio speaker, the second distributed power signal. A first load may be coupled to the first and second input power ports of the first powered audio speaker.

The method may further include receiving, by a first input power port of a second powered audio speaker, the third distributed power signal. The method may further include receiving, by a second input power port of the second powered audio speaker, the first distributed power signal. The method may further include receiving, by a third input power port of the second powered audio speaker, the second distributed power signal. A second load may be coupled to the first and second input power ports of the first powered audio speaker.

According to an example, the method may further include transmitting, by a first output power port of the second powered audio speaker, the second distributed power signal. The method may further include transmitting, by a second output power of the second powered audio speaker, the third distributed power signal. The method may further include transmitting, by a third output power port of the second powered audio speaker, the first distributed power signal.

The method may further include receiving, by a first input power port of a third powered audio speaker, the second distributed power signal. The method may further include receiving, by a second input power port of the third powered audio speaker, the third distributed power signal. The method may further include receiving, by a third input power port of the third powered audio speaker, the second distributed power signal. A third load may be coupled to the first and second input power ports of the third powered audio speaker.

According to an example, the method may further include receiving, by a first main input power port of a power distribution block a first main power signal. The first main power signal may have a first phase. The method may further include receiving, by a second main input power port of the power distribution block, a second main power signal. The second main power signal may have a second phase shifted 120 degrees from the first phase. The method may further include receiving, by a third main input power port of the power distribution block, a third distributed power signal. The third distributed power signal may have a third phase shifted 120 degrees from both the first phase and the second phase.

The method may further include transmitting, by a first distributed output power port of the power distribution block, the first distributed power signal to the first input power port of the first powered audio speaker. The method may further include transmitting, by a second distributed output power port of the power distribution block, the second distributed power signal to the first input power port of the first powered audio speaker. The method may further include transmitting, by a third distributed output power port of the power distribution block, the third distributed power signal to the third input power port of the first powered audio speaker. The method may further include transmitting, by a fourth distributed output power port of the power distribution block, the third distributed power signal to the first input power port of a fourth powered audio speaker. The method may further include transmitting, by a fifth distributed output power port of the power distribution block, the first distributed power signal to the first input power port of a fourth powered audio speaker. The method may further include transmitting, by a sixth distributed output power port of the power distribution block, the second distributed power signal to the third input power port of a fourth powered audio speaker.

In another aspect, a power distribution system is provided. The power distribution system may include a first powered audio speaker. The first powered audio speaker may include a first input power port. The first input power port may be configured to receive a first distributed power signal. The first distributed power signal has a first phase.

The first powered audio speaker may include a second input power port. The second input power port may be configured to receive a second distributed power signal. The second distributed power signal may have a second phase. The second phase may be shifted 120 degrees from the first phase.

The first powered audio speaker may include a third input power port. The third input power port may be configured to receive a third distributed power signal. The third distributed power signal may have a third phase. The third phase may be shifted 120 degrees from both the first phase and the second phase.

The first powered audio speaker may include an input neutral port. The input neutral port may be configured to receive a neutral signal.

The first powered audio speaker may include a first output power port. The first output power port may be electrically coupled to the third input power port. The first output power port may be configured to transmit the third distributed power signal.

The first powered audio speaker may include a second output power port. The second output power port may be electrically coupled to the first input power port. The second output power port may be configured to transmit the first distributed power signal.

The first powered audio speaker may include a third output power port. The third output power port may be electrically coupled to the second input power port. The third output power port may be configured to transmit the second distributed power signal.

The first powered audio speaker may include an output neutral port. The output neutral port may be configured to transmit the neutral signal.

The first powered audio speaker may include a first load. The first load may be electrically coupled to the first input power port and the input neutral port.

The power distribution system may include a second powered audio speaker. The second powered audio speaker may include a first input power port. The first input power port may be electrically coupled to the first output power port of the first powered audio speaker. The first input power port may be configured to receive the third distributed power signal.

The second powered audio speaker may include a second input power port. The second input power port may be electrically coupled to the second output power port of the first powered audio speaker. The second input power port may be configured to receive the first distributed power signal.

The second powered audio speaker may include a third input power port. The third input power port may be electrically coupled to the third output power port of the first powered audio speaker. The third input power port may be configured to receive the second distributed power signal.

The second powered audio speaker may include an input neutral port. The input neutral port may be electrically coupled to the output neutral port of the first powered audio speaker. The input neutral port may be configured to receive the neutral signal.

The second powered audio speaker may include a second load. The second load may be electrically coupled to the first input power port and the input neutral port.

The second powered audio speaker may include a first output power port. The first output power port may be electrically coupled to the third input power port. The first output power port may be configured to transmit the second distributed power signal.

The second powered audio speaker may include a second output power port. The second output power port may be electrically coupled to the first input power port. The second output power port may be configured to transmit the third distributed power signal.

The second powered audio speaker may include a third output power port. The third output power port may be electrically coupled to the second input power port. The third output power port may be configured to transmit the first distributed power signal.

The second powered audio speaker may include an output neutral port configured to transmit the neutral signal.

According to an example, the power distribution system may further include a third powered audio speaker. The third powered audio speaker may include a first input power port. The first input power port may be electrically coupled to the first output power port of the second powered audio speaker. The first input power port may be configured to receive the second distributed power signal.

The third powered audio speaker may include a second input power port. The second input power port may be electrically coupled to the second output power port of the second powered audio speaker. The second input power port may be configured to receive the third distributed power signal.

The third powered audio speaker may include a third input power port. The third input power port may be electrically coupled to the third output power port of the second powered audio speaker. The third input power port may be configured to receive the first distributed power signal.

The third powered audio speaker may include an input neutral port. The input neutral port may be electrically coupled to the output neutral port of the second powered audio speaker. The input neutral port may be configured to receive the neutral signal.

The third powered audio speaker may include a third load. The third load may be electrically coupled to the first input power port and the input neutral port.

The third powered audio speaker may include a first output power port. The first output power port may be electrically coupled to the third input power port. The first output power port may be configured to transmit the first distributed power signal.

The third powered audio speaker may include a second output power port. The second output power port may be electrically coupled to the first input power port. The second output power port may be configured to transmit the second distributed power signal.

The third powered audio speaker may include a third output power port. The third output power port may be electrically coupled to the second input power port. The third output power port may be configured to transmit the third distributed power signal.

The third powered audio speaker may include an output neutral port. The output neutral port may be configured to transmit the neutral signal.

According to an example, the power distribution system may further include a fourth powered audio speaker. The fourth powered audio speaker may include a first input power port. The first input power port may be electrically coupled to the first output power port of the third powered audio speaker. The first input power port may be configured to receive the first distributed power signal.

The fourth powered audio speaker may include a second input power port. The second input power port may be electrically coupled to the second output power port of the third powered audio speaker. The second input power port may be configured to receive the second distributed power signal.

The fourth powered audio speaker may include a third input power port electrically coupled to the third output power port of the third powered audio speaker. The third input power port may be configured to receive the third distributed power signal.

The fourth powered audio speaker may include an input neutral port. The input neutral port may be electrically coupled to the output neutral port of the third powered audio speaker. The input neutral port may be configured to receive the neutral signal.

The fourth powered audio speaker may include a fourth load. The fourth load may be electrically coupled to the first input power port and the input neutral port.

Other features and advantages will be apparent from the description and the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various examples.

FIG. 2B is a second section of a power and signal distribution schematic, according to an example of the present disclosure.

DETAILED DESCRIPTION

This disclosure generally relates to systems and methods for a power distribution system providing improved usage of three phase power in sound system applications. Professional touring and stadium performances require significant electrical power. For these applications three-phase power is more economical than two-phase (240 VAC) or single-phase (120 VAC). The three-phase power is most efficient when the loads on the three phases are balanced. Current powered speaker or amplifier distribution networks handle this by applying one load (such as a speaker or amplifier) to each phase. Accordingly, three loads are required to balance the three-phases (one load on each phase). However, due to constraints regarding speaker size and shipping capacity, many speaker systems are configured to be stacked and installed in groups of four. In many cases, four stacks are utilized in a venue, requiring power for sixteen speakers total. These groups of four do not balance well utilizing the method described above, leading to an un-balance of up to 50%.

This un-balance can be significantly reduced using a power distribution block and a wiring pass-through power scheme on each speaker. The power distribution block has a main three-phase power input with a main power breaker rated to sufficiently handle the requirements of the total system. The power distribution block includes a plurality of three-phase power outputs. Each output may be a power breaker rated for that individual stack of four speakers. Each individual speaker may be configured with a three-phase power input and output. Each of the power outputs on the power distribution block and each output on the powered speakers has the phases of the power shifted by 120 degrees. Accordingly, the phase shift configuration requires a custom connector to be used to prevent any confusion or mis-wiring of the phases to a different application or load.

Figure 1A:
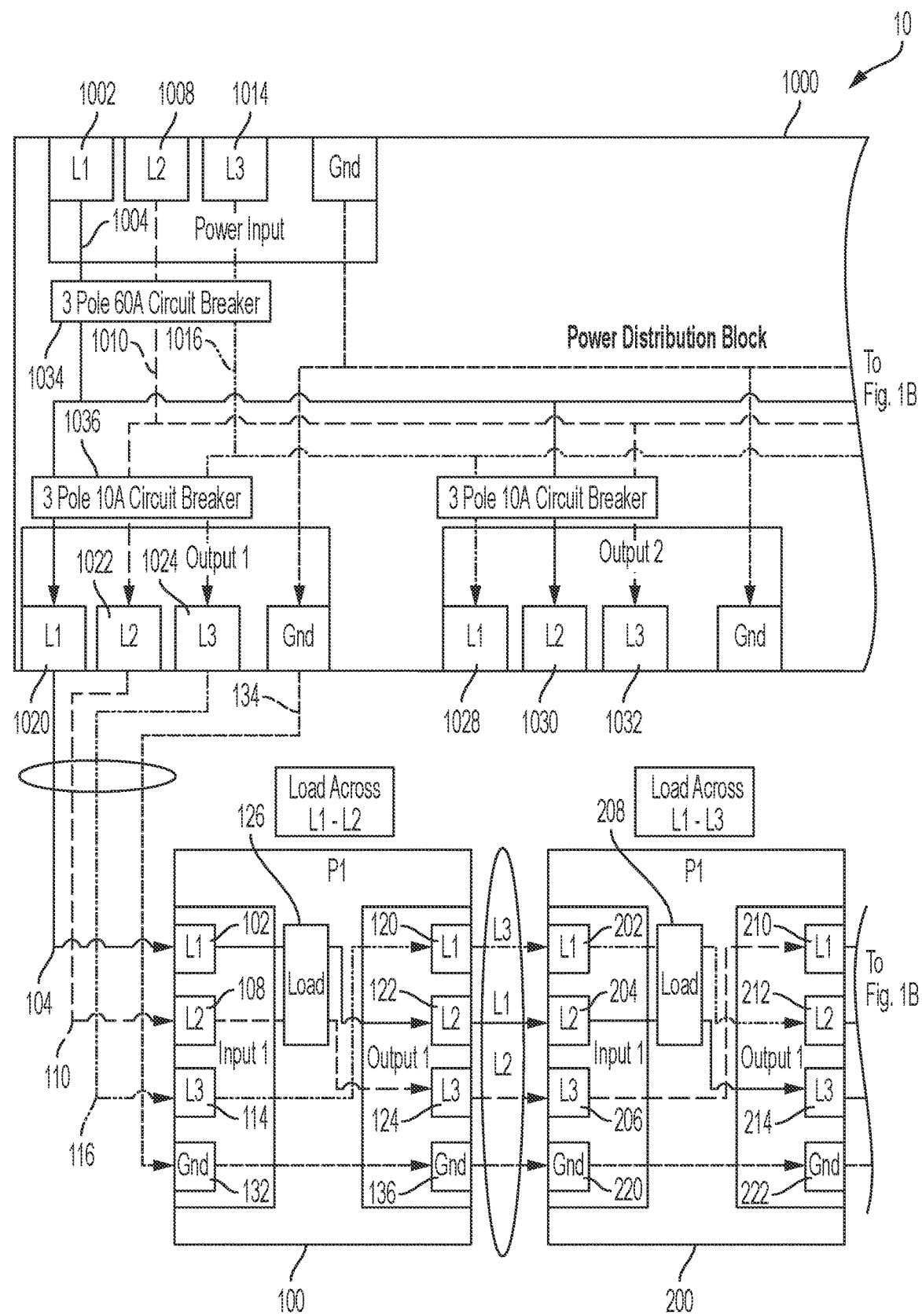
FIG. 1A is a first section of a power distribution schematic, according to an example of the present disclosure.

In one aspect, and with reference to FIGS. 1A-3, a power distribution system 10 is provided. As described above, the power distribution system 10 is configured to more efficiently distribute power to multiple powered speakers. The power distribution system 10 may include a first powered audio speaker 100. A portion of the components first powered audio speaker 100 are shown in FIG. 1A. The first powered audio speaker 100 may be configured to be stackable. In one example, the first powered audio speaker 100 may be configured to stack in groups of four. In a further example, four groups of four speakers (sixteen speakers total) are used. In an even further example, the system 10 may include up to six groups of four speakers (twenty-four speakers total). The first powered audio speaker 100 may generate sound pressure sufficient to, either individually or in combination with other powered audio speakers, to provide sufficient sound in an arena, stadium, theater, auditorium, performance hall, religious venue, or any other indoor or outdoor setting requiring amplified audio. Other powered audio speakers of the power distribution system 10 may be similarly configured as the first 100.

The first powered audio speaker 100 may include a first input power port 102. The first input power port 102 may be configured to receive a first distributed power signal 104. The first input power port 102, and any other input and/or output ports described herein, may include one or more connectors or adapters suitable to mate with a cable transmitting a power signal. The distributed power signals may be sourced from a power distribution block 1000. Alternatively, the distributed power signals may be source directly from a three-phase power system of the venue or by a three-phase generator. The first distributed power signal 104 may have a first phase 106.

The first powered audio speaker 100 may further include a second input power port 108. The second input power port 108 may be configured to receive a second distributed power signal 110. The second distributed power signal 110 may have a second phase 112. The second phase 112 may be shifted 120 degrees from the first phase 106. For example, if the first phase 106 is 0 degrees, the second phase 112 may be 120 degrees.

The first powered audio speaker 100 may include a third input power port 114. The third input power port 114 may be configured to receive a third distributed power signal 116. The third distributed power signal 116 may have a third phase 118. The third phase 118 may be shifted 120 degrees from both the first phase 106 and the second phase 112. For example, if the first phase 106 is 0 degrees, and the second phase 112 is 120 degrees, the third phase 118 may be 240 degrees.

The first powered audio speaker 100 may include a first output power port 120. As shown in FIG. 1A, the first output power port 120 may be electrically coupled to the third input power port 114. The first output power port 120 may be configured to transmit the third distributed power signal 116. This transmission is designated by power signal path L3 in between the first 100 and second 200 powered audio speakers. L3 corresponds to the signal received by the third input power port 114 of the first powered audio speaker 100.

The first powered audio speaker 100 may include a second output power port 122. As shown in the FIG. 1A, the second output power port 122 may be electrically coupled to the first input power port 102. The second output power port 122 may be configured to transmit the first distributed power signal 104. This transmission is designated by power signal path L1 in between the first 100 and second 200 powered audio speakers. L1 corresponds to the signal received by the first input power port 102 of the first powered audio speaker 100.

The first powered audio speaker 100 may include a third output power port 124. As shown in FIG. 1A, the third output power port 124 may be electrically coupled to the second input power port 108. The third output power port 124 may be configured to transmit the second distributed power signal 110. This transmission is designated by power signal path L2 in between the first 100 and second 200 powered audio speakers. L2 corresponds to the signal received by the second input power port 108 of the first powered audio speaker 100.

Figure 4A:
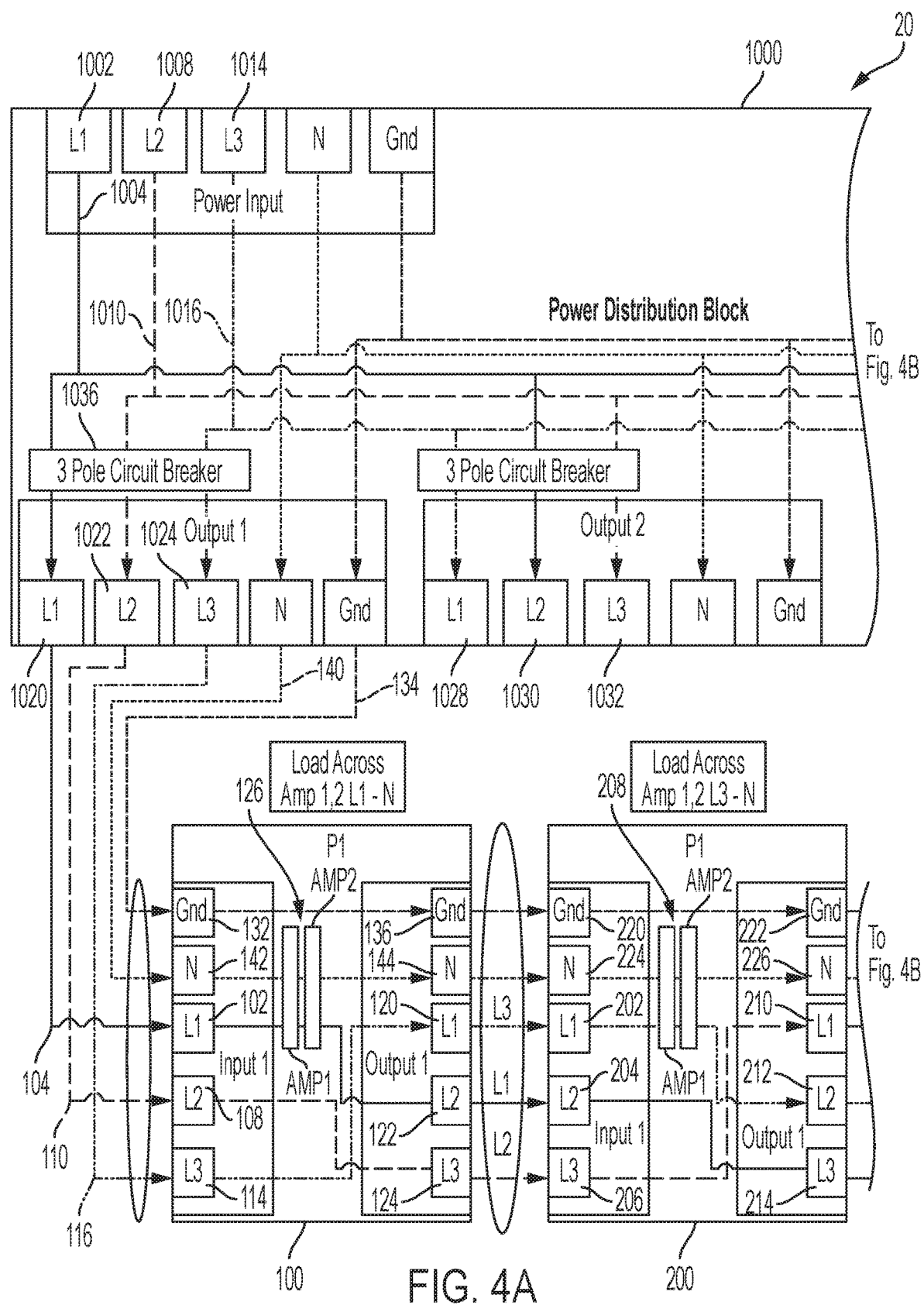
FIG. 4A is a first section of a further power distribution schematic, according to an example of the present disclosure.
Figure 4B:
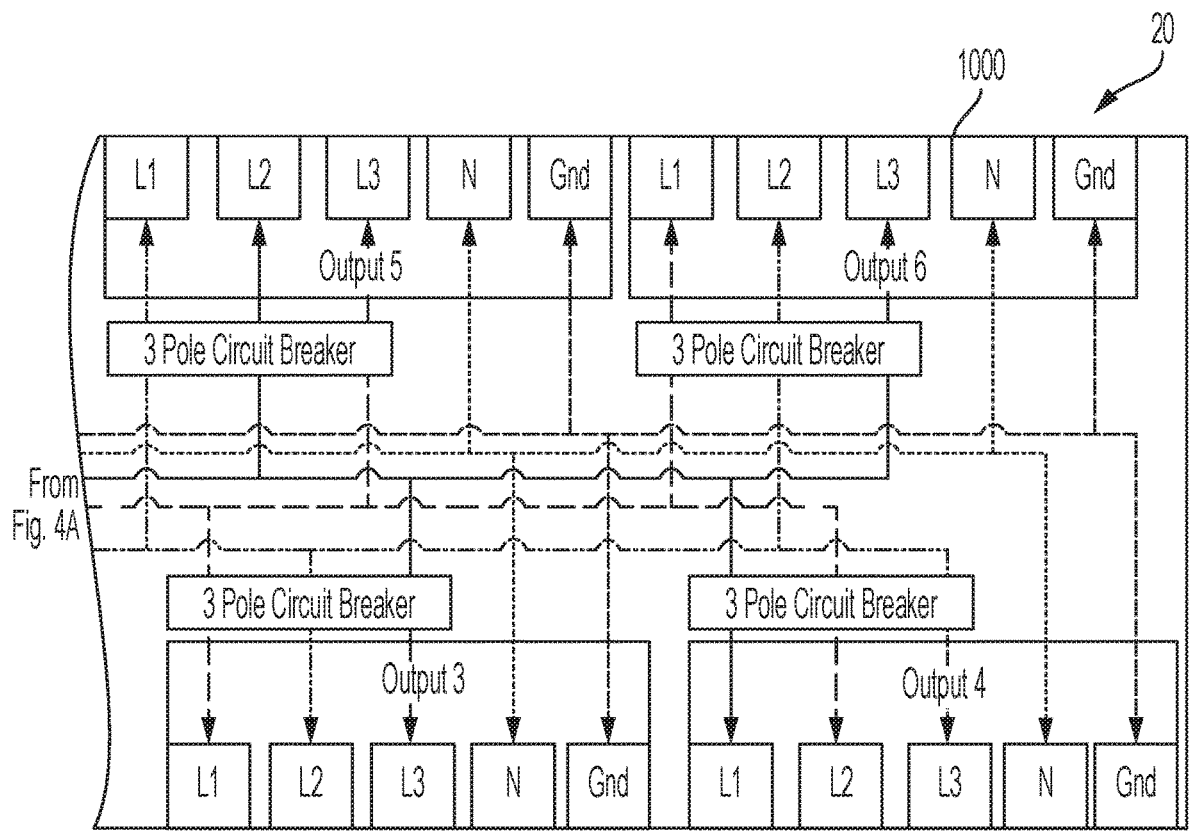
FIG. 4B is a second section of the further power distribution schematic, according to an example of the present disclosure.
Figure 4B:
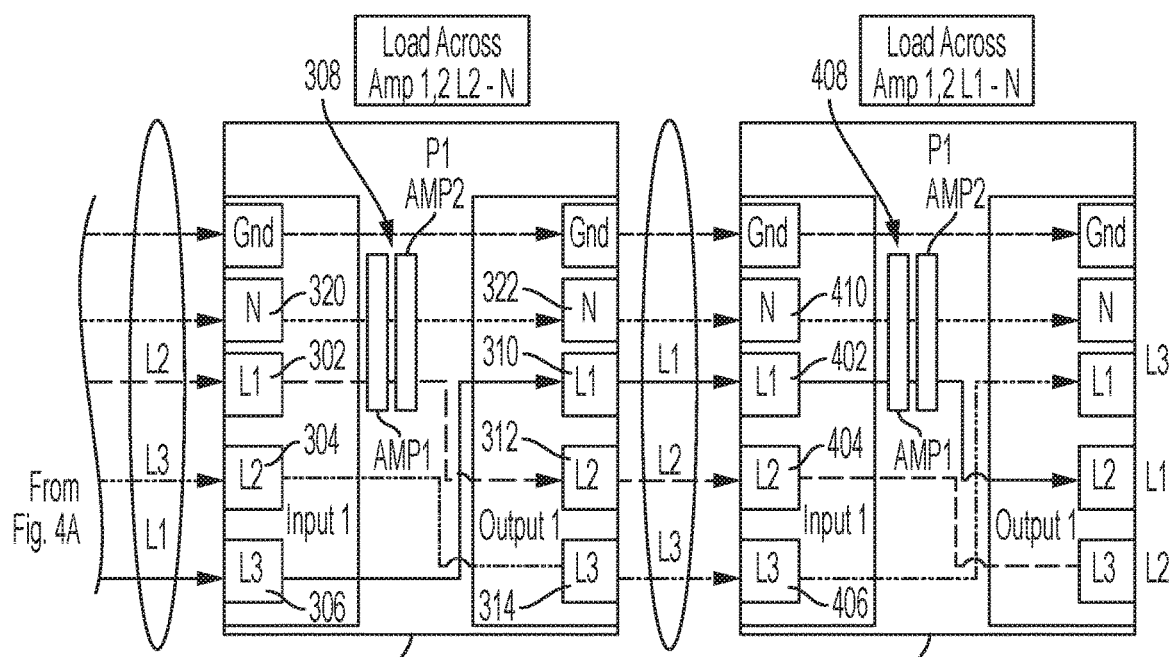

The first powered audio speaker 100 may include a first load 126. The first load 126 may be electrically coupled to the first input power port 102 and the second input power port 108. In this configuration, the first load 126 is arranged in a three-phase delta configuration across the first 104 and second 110 distributed power signals. Alternatively, the first load 126, and other speaker loads described herein, may be arranged in three-phase Wye configuration across one of the distributed power signals and a neutral path. The three-phase Wye configuration of loads is described in more detail below, and is shown in FIGS. 4A and 4B. In a typical implementation under United States standards, the delta configuration will provide 208 VAC across each load. By contrast, the Wye configuration will provide 120 VAC across each load. Further, the delta configuration is simpler than the Wye configuration, as the delta configuration does not require a neutral path. Like the power signals, the neutral path may be similarly distributed to the powered audio speakers of the system 10, but without phase shifting due to safety concerns.

According to an example, the first load 126, or any other load of the system 10, may be an audio transducer. The audio transducers may be configured to convert audio signals received by the load into audible sound pressure. The loads may be any audio transducer practical for use in a speaker system 10 used in the environments described above. In other examples, one or more of the loads may be amplifiers. The amplifiers may be configured to increase the amplitude of audio signals received by the speakers.

The power distribution system 10 may further include a second powered audio speaker 100. The second powered audio speaker 200 may include a first input power port 202. The first input power port 202 may be electrically coupled to the first output power port 120 of the first powered audio speaker 100. The first input power port 202 may be configured to receive the third distributed power signal 116.

The second powered audio speaker 200 may include a second input power port 204. The second input power port 204 may be electrically coupled to the second output power port 122 of the first powered audio speaker 100. The second input power port 204 may be configured to receive the first distributed power signal 104.

The second powered audio speaker 200 may include a third input power port 206. The third input power port 206 may be electrically coupled to the third output power port 124 of the first powered audio speaker 100. The third input power port 206 may be configured to receive the second distributed power signal 110.

Figure 1B:
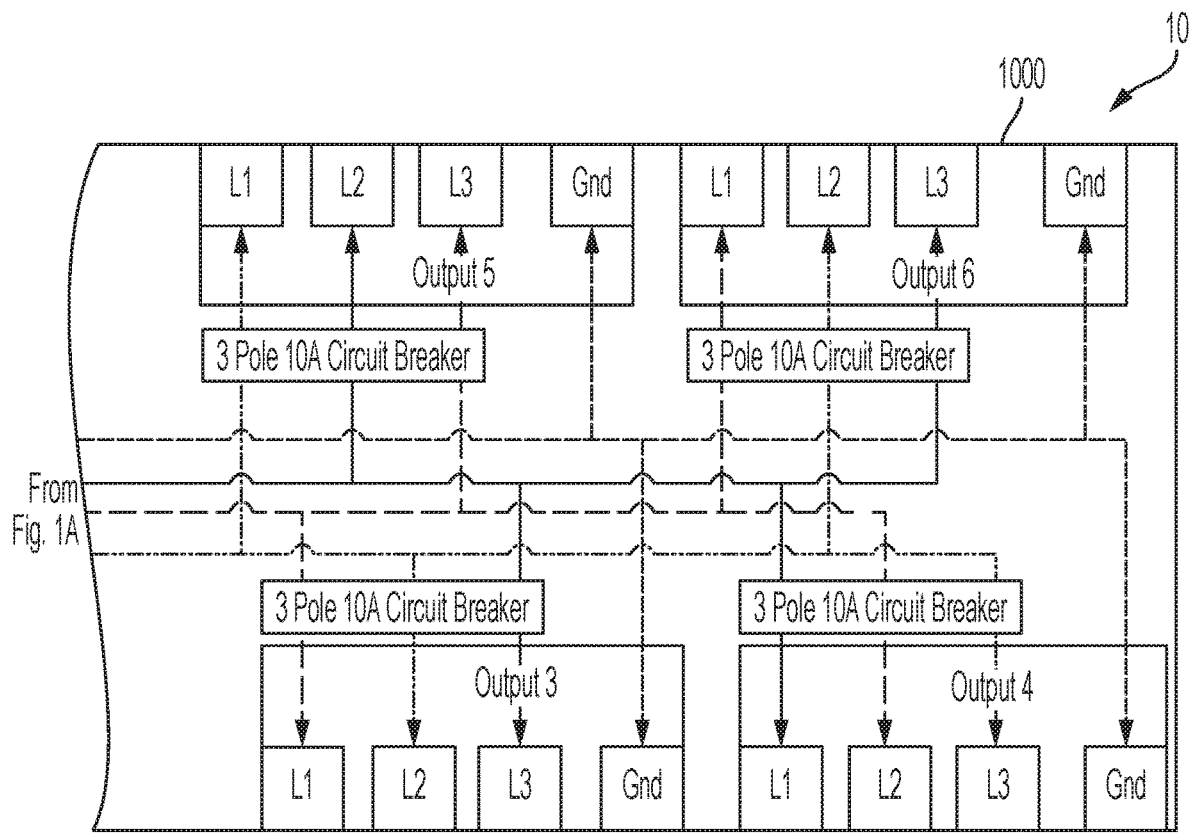
FIG. 1B is a second section of the power distribution schematic, according to an example of the present disclosure.
Figure 1B:
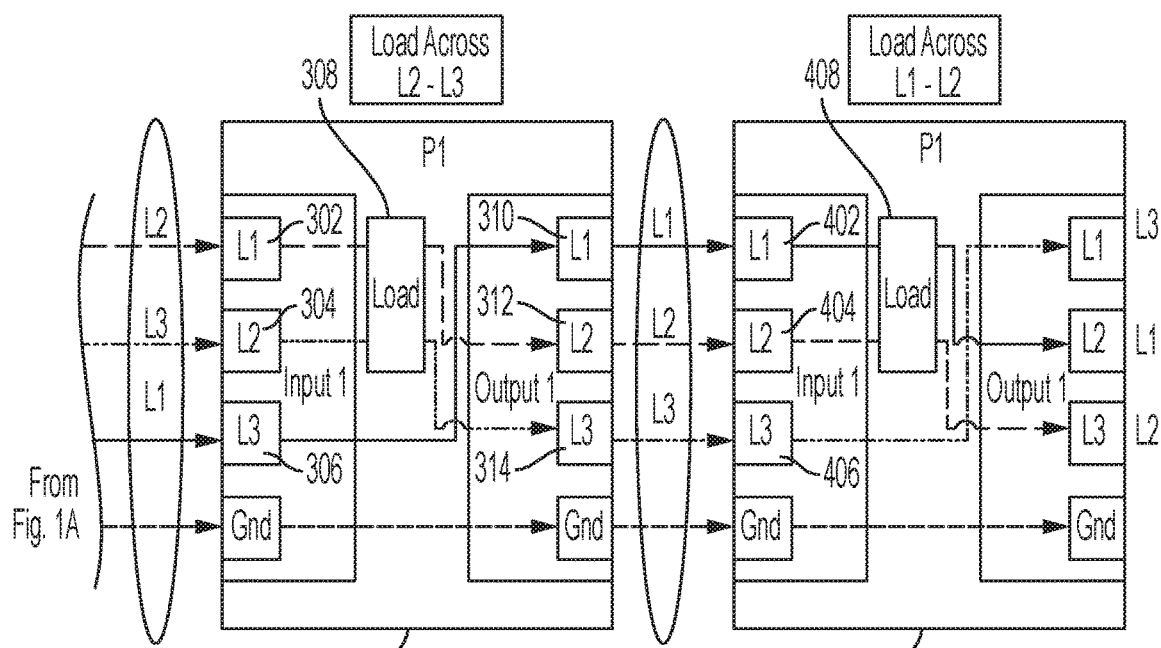

The second powered audio speaker 200 may include a second load 208. The second load 208 may be electrically coupled to the first input power port 202 and the second input power port 204. In this configuration, the second load 208 is arranged in a three-phase delta configuration across the third 116 and first 104 distributed power signals, thus shifting the power supplied to the second load 208 relative to the power supplied to the first load 126. As will be described in further detail below, and as can be seen in FIGS. 1A and 1B, the system 10 will cycle through three shifts of the power supplied to the loads of the speakers.

According to an example, the second powered audio speaker 200 may further include a first output power port 210. The first output power port 210 may be electrically coupled to the third input power port 206. The first output power port 210 may be configured to transmit the second distributed power signal 110. This transmission is designated by power signal path L2 in between the second 200 and third 300 powered audio speakers. L2 corresponds to the signal received by the second input power port 108 of the first powered audio speaker 100.

The second powered audio speaker 200 may include a second output power port 212. The second output power port 212 may be electrically coupled to the first input power port 202. The second output power port 212 may be configured to transmit the third distributed power signal 116. This transmission is designated by power signal path L3 in between the second 200 and third 300 powered audio speakers. L3 corresponds to the signal received by the third input power port 114 of the first powered audio speaker 100.

The second powered audio speaker 200 may include a third output power port 214. The third output power port 214 may be electrically coupled to the second input power port 204. The third output power port 214 may be configured to transmit the first distributed power signal 102. This transmission is designated by power signal path L1 in between the second 200 and third 300 powered audio speakers. L1 corresponds to the signal received by the first input power port 102 of the first powered audio speaker 100.

According to an example, and with reference to FIG. 1B, the power distribution system 10 may include a third powered audio speaker 300. The third powered audio speaker 300 may include a first input power port 302. The first input power port 302 may be electrically coupled to the first output power port 210 of the second powered audio speaker 200. The first input power port 302 may be configured to receive the second distributed power signal 110.

The third powered audio speaker 300 may include a second input power port 304. The second input power port 304 may be electrically coupled to the second output power port 212 of the second powered audio speaker 200. The second input power port 304 may be configured to receive the third distributed power signal 116.

The third powered audio speaker 300 may include a third input power port 306. The third input power port 306 may be electrically coupled to the third output power port 214 of the second powered audio speaker 210. The third input power port 306 may be configured to receive the first distributed power signal 104.

The third powered audio speaker 300 may include a third load 308. The third load 308 may be electrically coupled to the first input power port 302 and the second input power port 304. In this configuration, the third load 308 is arranged in a three-phase delta configuration across the second 110 and third 116 distributed power signals, thus shifting the power supplied to the third load 308 relative to the power supplied to the first load 126 and the second load 208.

According to an example, the third powered audio speaker 300 may include a first output power port 310. The first output power port 310 may be electrically coupled to the third input power port 306. The first output power port 310 may be configured to transmit the first distributed power signal 104. This transmission is designated by power signal path L1 in between the third 300 and fourth 400 powered audio speakers. L1 corresponds to the signal received by the first input power port 102 of the first powered audio speaker 100.

The third powered audio speaker 300 may include a second output power port 312. The second output power port 312 may be electrically coupled to the first input power port 302. The second output power port 312 may be configured to transmit the second distributed power signal 108. This transmission is designated by power signal path L2 in between the third 300 and fourth 400 powered audio speakers. L2 corresponds to the signal received by the second input power port 108 of the first powered audio speaker 100.

The third powered audio speaker 300 may include a third output power port 314. The third output power port 314 may be electrically coupled to the second input power port 304. The third output power port 314 may be configured to transmit the third distributed power signal 116. This transmission is designated by power signal path L3 in between the third 300 and fourth 400 powered audio speakers. L3 corresponds to the signal received by the third input power port 114 of the first powered audio speaker 100.

According to an example, and with reference to FIG. 1B, the power distribution system 10 may include a fourth powered audio speaker 400. The fourth powered audio speaker 400 may include a first input power port 402. The first input power port 402 may be electrically coupled to the first output power port 310 of the third powered audio speaker 300. The first input power port 402 may be configured to receive the first distributed power signal 104.

The fourth powered audio speaker 400 may include a second input power port 404. The second input power port 404 may be electrically coupled to the second output power port 312 of the third powered audio speaker 300. The second input power port 404 may be configured to receive the second distributed power signal 110.

The fourth powered audio speaker 400 may include a third input power port 406. The third input power port 406 may be electrically coupled to the third output power port 314 of the third powered audio speaker 300. The third input power port 406 may be configured to receive the third distributed power signal 116.

The fourth powered audio speaker 400 may include a fourth load 408. The fourth load 408 may be electrically coupled to the first input power port 402 and the second input power port 404. In this configuration, the fourth load 408, like the first load 126 of the first powered audio speaker 100, is arranged in a three-phase delta configuration across the first 104 and second 110 distributed power signals. This demonstrates that the first 100 and fourth 400 powered audio speakers will receive and transmit the power signals 104, 110, 116 in the same arrangement due to the cyclical nature of the power shifting scheme.

In a further example, the loads 126, 208, 308, 408, may each be coupled to the second and third input power ports of their respective powered speakers to achieve phase shifting.

Further configuration of the inputs and outputs of the powered audio speakers may be possible to achieve phase shifting. For example, the first input power port may be coupled to the third output power port, the second input power port may be coupled to the first output power port, and the third input power port may be coupled to the second output power port.

Figure 2A:
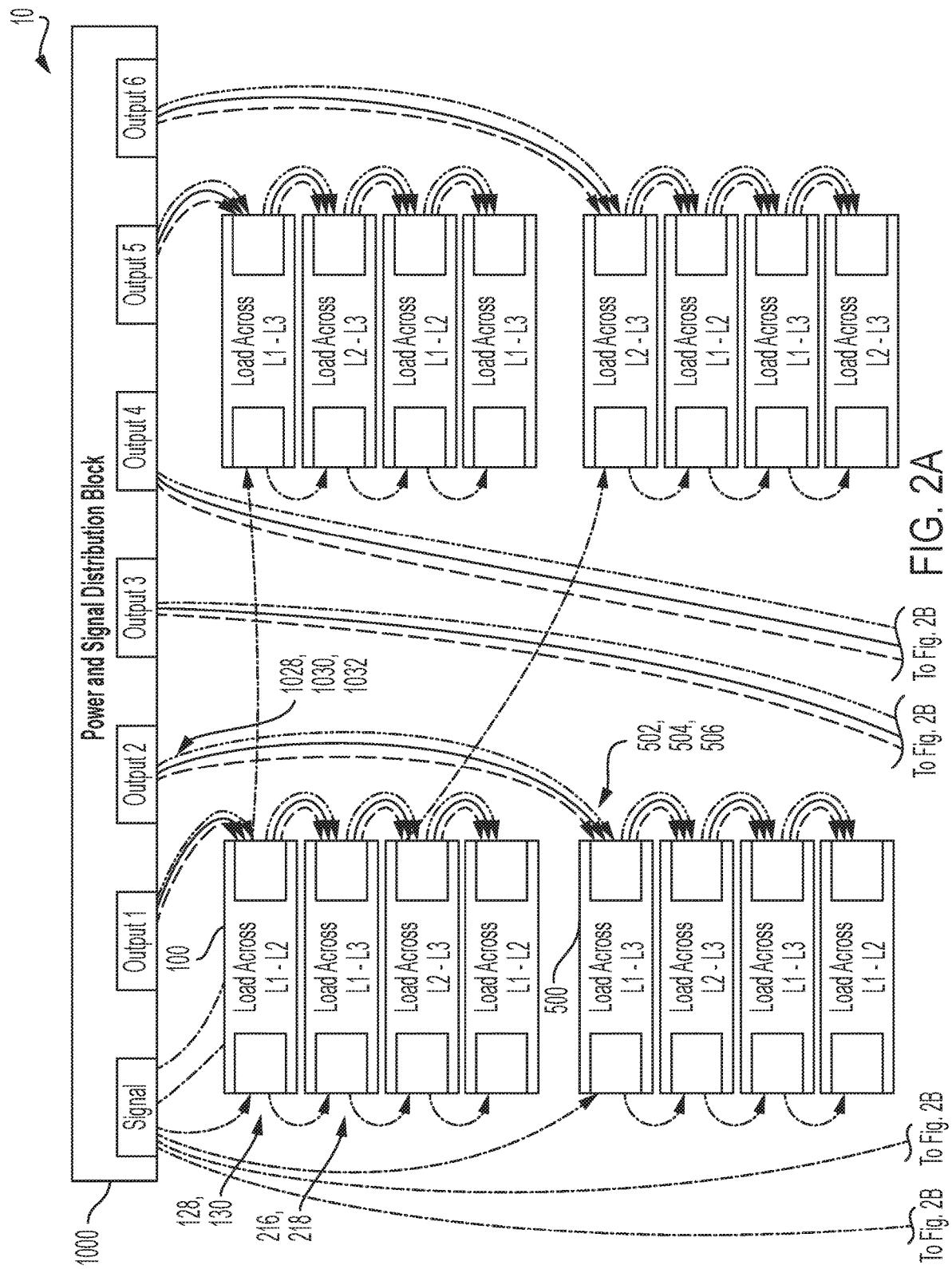
FIG. 2A is a first section of a power and signal distribution schematic, according to an example of the present disclosure.
Figure 3:
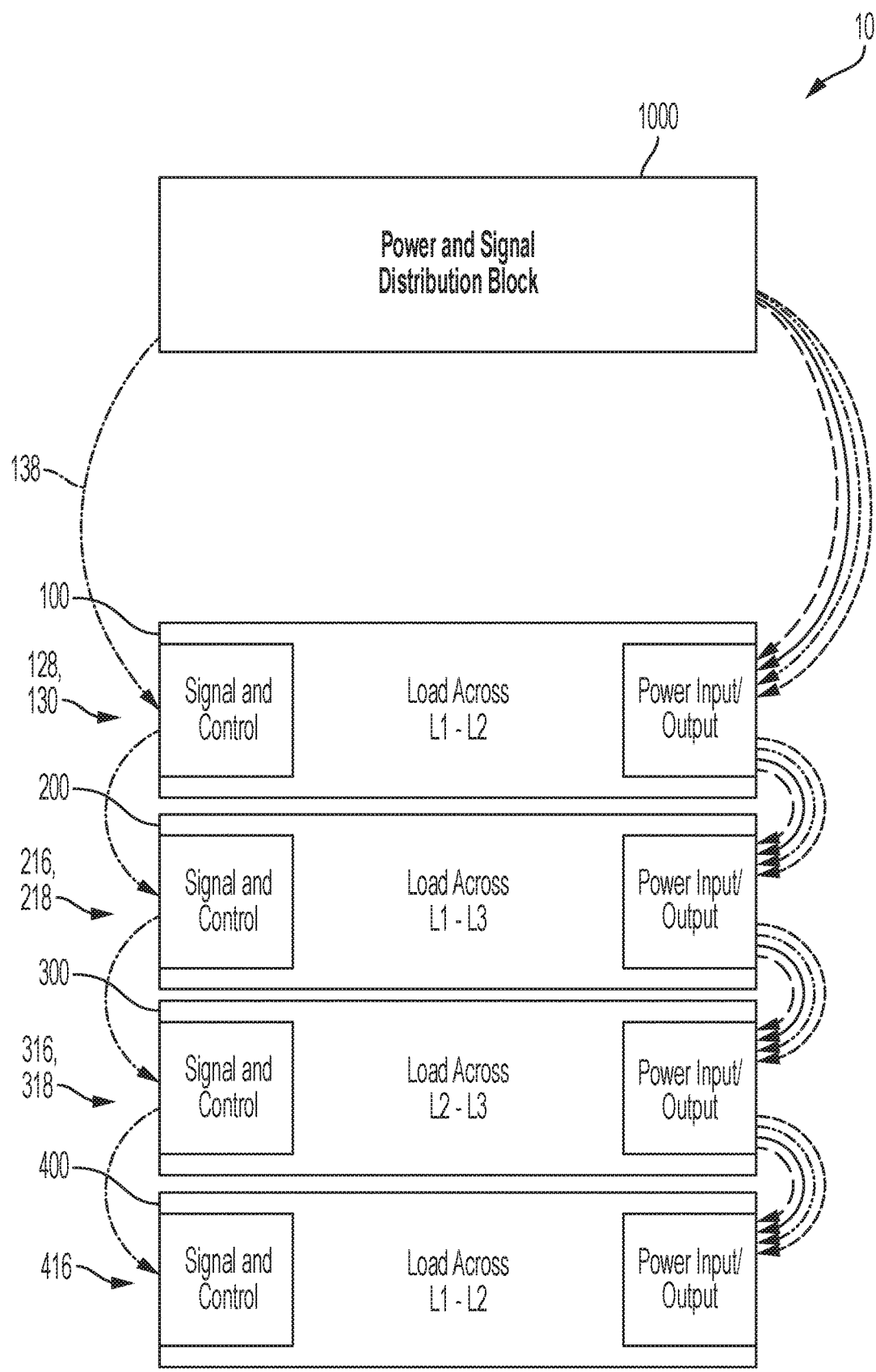
FIG. 3 is a power, signal, and control distribution schematic, according to an example of the present disclosure.

According to an example, and with reference to FIGS. 2A-3, the first powered audio speaker 100 may include an input audio port 128. The input audio port 128 may be configured to receive an audio signal 138. The first load 126 may transduce the audio 138 into audible sound pressure. The first load 126 may be configured to amplify the amplitude of the audio signal 138. The audio signal 138 may be provided by the power distribution block 1000. The audio signal 138 may be digital or analog. The first powered audio speaker 100 may further include an output audio port 130. The output audio port 130 may be configured to transmit the audio signal 138. The audio signals and input and/or output audio ports recited herein may conform with the Audio Engineering Society/European Broadcasting Union (AES/EBU) standards. For example, the input and/or output audio ports may include XLR or BNC connectors.

According to an example, the second powered audio speaker 200 may include an input audio port 216. The input audio port 216 may be coupled to the output audio port 130 of the first powered audio speaker 100. The input audio port 216 may be configured to receive the audio signal 138. The second powered audio speaker 200 may include an output audio port 218. The output audio port 218 may be configured to transmit the audio signal 138.

According to an example, the third powered audio speaker 300 may include an input audio port 316. The input audio port 316 may be coupled to the output audio port 218 of the second powered audio speaker 200. The input audio port 316 may be configured to receive the audio signal 138. The third powered audio speaker 300 may include an output audio port 318 configured to transmit the audio signal 138.

According to an example, the fourth powered audio speaker 400 may include an input audio port 416. The input audio port 416 may be coupled to the output audio port 318 of the third powered audio speaker 300. The input audio port 416 may be configured to receive the audio signal 138. The audio signal 138 may be provided to additional powered audio speakers in a similar manner. Further, and as shown in FIG. 3, a control signal may be distributed to the powered audio speakers in a similar manner as the audio signal. In an even further example, the audio signal 138 may include networked audio compatible with a DANTE, MILAN, or AVB system.

According to an example, and with respect to FIG. 1A, the first powered audio speaker 100 may include an input ground port 132. The input ground port 132 may be configured to receive a ground signal 134. The ground signal 134 may be provided by the power distribution block 1000. The first powered audio speaker 100 may further comprise an output ground port 136 configured to transmit the ground signal 134.

According to an example, the second powered audio speaker 200 may include an input ground port 220. The input ground port 220 may be coupled to the output ground port 136 of the first powered audio speaker 100. The input ground port 220 may be configured to receive the ground signal 134. The second powered audio speaker 200 may include an output ground port 222. The output ground port 222 may be configured to transmit the ground signal 134.

According to an example, and with reference to FIGS. 1A-3, the power distribution system 10 may include a power distribution block 1000. The power distribution block 1000 may be configured to connect to the main three-phase power of the venue or generator, and distribute the power to individual stacks of speakers. The power distribution block 1000 may be configured to produce the first 104, second 110, and third 116 distributed power signals.

The power distribution block 1000 may include a first main input power port 1002. The first main input power port 1002 may be configured to receive a first main power signal 1004. The first main power signal 1004 may have a first phase 1006.

The power distribution block 1000 may include a second main input power port 1008. The second main input power port 1008 may be configured to receive a second main power signal 1010. The second main power signal 1010 may have a second phase 1012. The second phase 1012 may be shifted 120 degrees from the first phase 1006. For example, if the first phase 1006 is 0 degrees, the second phase 1012 may be 120 degrees.

The power distribution block 1000 may include a third main input power port 1014. The third main input power port 1014 may be configured to receive a third main power signal 1016. The third main power signal 1016 may have a third phase 1018. The third phase 1018 may be shifted 120 degrees from both the first phase 1006 and the second phase 1012. For example, if the first phase 1006 is 0 degrees, and the second phase 1012 is 120 degrees, the third phase 1018 may be 240 degrees.

The power distribution block 1000 may include a first distributed output power port 1020. As shown in FIG. 1A, the first distributed output power port 1020 may be electrically coupled to the first main input power port 1002. The first distributed output power port 1020 may be configured to transmit the first distributed power signal 104 to the first input power port 102 of the first powered audio speaker 100.

The power distribution block 1000 may include a second distributed output power port 1022. As shown in FIG. 1A, the second distributed output power port 1022 may be electrically coupled to the second main input power port 1008. The second distributed output power port 1022 may be configured to transmit the second distributed power signal 110 to the second input power port 108 of the first powered audio speaker 100.

The power distribution block 100 may include a third distributed output power port 1024. As shown in FIG. 1A, the third distributed output power port 1024 may be electrically coupled to the third main input power port 1014. The third distributed output power port 1024 may be configured to transmit the third distributed power signal 116 to the third input power port 114 of the first powered audio speaker 100.

According to an example, the power distribution block 1000 may include a fourth distributed output power port 1028. As shown in FIG. 2A, the fourth distributed output power port 1028 may be electrically coupled to the third main input power port 1014. The fourth distributed output power port 1028 may be configured to transmit the third distributed power signal 116 to a first input power port 502 of a fifth powered audio speaker 500.

The power distribution block 500 may further include a fifth distributed output power port 1030. The fifth distributed output power port 1030 may be electrically coupled to the first main input power port 1002. The fifth distributed output power port may be configured to transmit the first 104 distributed power signal to a second input power port 504 of the fifth powered audio speaker 500.

The power distribution block 500 may further include a sixth distributed output power port 1032. The sixth distributed output power port 500 may be electrically coupled to the second main input power port 1008. The sixth distributed output power port 1032 may be configured to transmit the second distributed power signal 110 to a third input power port 506 of the fifth powered audio speaker 500. Accordingly, each successive output grouping of the power distribution block 1000 is phase shifted from the previous grouping in a manner analogous to the speakers.

According to an example, and as shown in FIG. 1A, the power distribution block 1000 may include a main power circuit breaker 1034. The main power circuit breaker 1034 may be electrically coupled to at least one of the first 1002, second 1008, or third 1014 main input power ports. The main power circuit breaker 1034 may be arranged to prevent damage to the block 1000 and downstream devices, such as speakers, in the event of a power surge. The main power circuit breaker 1034 may be rated for 60 A.

According to an example, and as shown in FIG. 1A, the power distribution block 1000 may include a distributed power circuit breaker 1036. The distributed power circuit breaker 1036 may be electrically coupled to at least one of the first 1020, second 1022, or third 1024 distributed output power ports. The distributed power circuit breaker 1036 may be arranged to prevent damage to the downstream devices, such as speakers, in the event of a power surge. The distributed power circuit breaker 1036 may be rated for 10 A. Additional distributed power circuit breakers 1036 may be implemented throughout the block 1000.

According to an example, a main signal current of the first 1004, second 1010, and third 1016 main power signals may be greater than a distributed signal current of the first 1020, second 1022, or third 1024 distributed power signals. This relationship may be dictated by the number of distributed power output ports connected to speakers. This relationship may further be reflected by the difference in current ratings of the main power circuit breaker 1034, such as 60 A, and the distributed power circuit breaker 1036, such as 10 A.

In another aspect, and with references to FIGS. 4A and 4B, a power distribution system 20 is provided. This power distribution system 20 may be configured to supply loads in a Wye configuration. The power distribution system 20 may include a first powered audio speaker 100. The first powered audio speaker 100 may include a first input power port 102. The first input power port 102 may be configured to receive a first distributed power signal 104. The first distributed power 104 signal has a first phase 106.

The first powered audio speaker 100 may include a second input power port 108. The second input power port 108 may be configured to receive a second distributed power signal 110. The second distributed power signal 110 may have a second phase 112. The second phase 112 may be shifted 120 degrees from the first phase 106.

The first powered audio speaker 100 may include a third input power port 114. The third input power port 114 may be configured to receive a third distributed power signal 116. The third distributed power signal 116 may have a third phase 118. The third phase 118 may be shifted 120 degrees from both the first phase 106 and the second phase 112.

The first powered audio speaker 100 may include an input neutral port 142. The input neutral port 142 may be configured to receive a neutral signal 140.

The first powered audio speaker 100 may include a first output power port 120. The first output power port 120 may be electrically coupled to the third input power port 114. The first output power port 120 may be configured to transmit the third distributed power signal 116.

The first powered audio speaker 100 may include a second output power port 122. The second output power port 122 may be electrically coupled to the first input power port 102. The second output power port 122 may be configured to transmit the first distributed power signal 104.

The first powered audio speaker 100 may include a third output power port 124. The third output power port 124 may be electrically coupled to the second input power port 108. The third output power port 124 may be configured to transmit the second distributed power signal 110.

The first powered audio speaker 100 may include an output neutral port 144. The output neutral port 144 may be configured to transmit the neutral signal 140.

The first powered audio speaker 100 may include a first load 126. The first load 126 may be electrically coupled to the first input power port 102 and the input neutral port 140. In one example, the first load 126, or any other load in the system 20, may be an audio transducer. In another example, the first load 126, or any other load in the system 20, may include one or more amplifiers. FIG. 4A shows the first load 126 as two amplifiers, AMP1 and AMP2.

The power distribution system 20 may include a second powered audio speaker 200. The second powered audio speaker 200 may include a first input power port 202. The first input power port 202 may be electrically coupled to the first output power port 120 of the first powered audio speaker 100. The first input power port 202 may be configured to receive the third distributed power signal 116.

The second powered audio speaker 200 may include a second input power port 204. The second input power port 204 may be electrically coupled to the second output power port 122 of the first powered audio speaker 100. The second input power port 204 may be configured to receive the first distributed power signal 104.

The second powered audio speaker 200 may include a third input power port 206. The third input power port 206 may be electrically coupled to the third output power port 124 of the first powered audio speaker 100. The third input power port 206 may be configured to receive the second distributed power signal 110.

The second powered audio speaker 200 may include an input neutral port 224. The input neutral port 224 may be electrically coupled to the output neutral port 144 of the first powered audio speaker 100. The input neutral port 224 may be configured to receive the neutral signal 140.

The second powered audio speaker 200 may include a second load 208. The second load 208 may be electrically coupled to the first input power port 202 and the input neutral port 224. As shown in FIG. 4A, the second load 208 may include two amplifiers, AMP1 and AMP2. As will be described in further detail below, and as can be seen in FIGS. 4A and 4B, the system 20 will cycle through three shifts of the power supplied to the loads of the speakers.

The second powered audio speaker 200 may include a first output power port 210. The first output power port 210 may be electrically coupled to the third input power port 206. The first output power port 210 may be configured to transmit the second distributed power signal 110.

The second powered audio speaker 200 may include a second output power port 212. The second output power port 212 may be electrically coupled to the first input power port 202. The second output power port 212 may be configured to transmit the third distributed power signal 116.

The second powered audio speaker 200 may include a third output power port 214. The third output power port 214 may be electrically coupled to the second input power port 204. The third output power port 214 may be configured to transmit the first distributed power signal 104.

The second powered audio speaker 200 may include an output neutral port 226 configured to transmit the neutral signal 140.

According to an example, the power distribution system 20 may further include a third powered audio speaker 300. The third powered audio speaker 300 may include a first input power port 320. The first input power port 302 may be electrically coupled to the first output power port 210 of the second powered audio speaker 200. The first input power port 302 may be configured to receive the second distributed power signal 110.

The third powered audio speaker 300 may include a second input power port 304. The second input power port 304 may be electrically coupled to the second output power port 212 of the second powered audio speaker 200. The second input power port 304 may be configured to receive the third distributed power signal 116.

The third powered audio speaker 300 may include a third input power port 306. The third input power port 306 may be electrically coupled to the third output power port 214 of the second powered audio speaker 200. The third input power port 306 may be configured to receive the first distributed power signal 104.

The third powered audio speaker 400 may include an input neutral port 320. The input neutral port 20 may be electrically coupled to the output neutral port 226 of the second powered audio speaker 200. The input neutral port 320 may be configured to receive the neutral signal 140.

The third powered audio speaker 400 may include a third load 308. The third load 308 may be electrically coupled to the first input power port 302 and the input neutral port 320. As shown in FIG. 4B, the third load 308 may include two amplifiers, AMP1 and AMP2.

The third powered audio speaker 300 may include a first output power port 310. The first output power port 310 may be electrically coupled to the third input power port 306. The first output power 310 port may be configured to transmit the first distributed power signal 104.

The third powered audio speaker 300 may include a second output power port 312. The second output power port 312 may be electrically coupled to the first input power port 302. The second output power port 312 may be configured to transmit the second distributed power signal 110.

The third powered audio speaker 300 may include a third output power port 314. The third output power port 314 may be electrically coupled to the second input power port 304. The third output power port 314 may be configured to transmit the third distributed power signal 116.

The third powered audio speaker 300 may include an output neutral port 322. The output neutral port 322 may be configured to transmit the neutral signal 140.

According to an example, the power distribution system 20 may further include a fourth powered audio speaker 400. The fourth powered audio speaker 400 may include a first input power port 402. The first input power 402 port may be electrically coupled to the first output power port 310 of the third powered audio speaker 300. The first input power port 402 may be configured to receive the first distributed power signal 104.

The fourth powered audio speaker 400 may include a second input power port 404. The second input power port 404 may be electrically coupled to the second output power port 312 of the third powered audio speaker 300. The second input power port 404 may be configured to receive the second distributed power signal 110.

The fourth powered audio speaker 400 may include a third input power port 406. The third input power port 406 may be electrically coupled to the third output power port 314 of the third powered audio speaker 300. The third input power port 406 may be configured to receive the third distributed power signal 116.

The fourth powered audio speaker 400 may include an input neutral port 410. The input neutral port 410 may be electrically coupled to the output neutral port 322 of the third powered audio speaker 300. The input neutral port 410 may be configured to receive the neutral signal 140.

The fourth powered audio speaker 400 may include a fourth load 408. The fourth load 408 may be electrically coupled to the first input power port 402 and the input neutral port 410. As shown in FIG. 4B, the fourth load 408 may include two amplifiers, AMP1 and AMP2.

Figure 5:
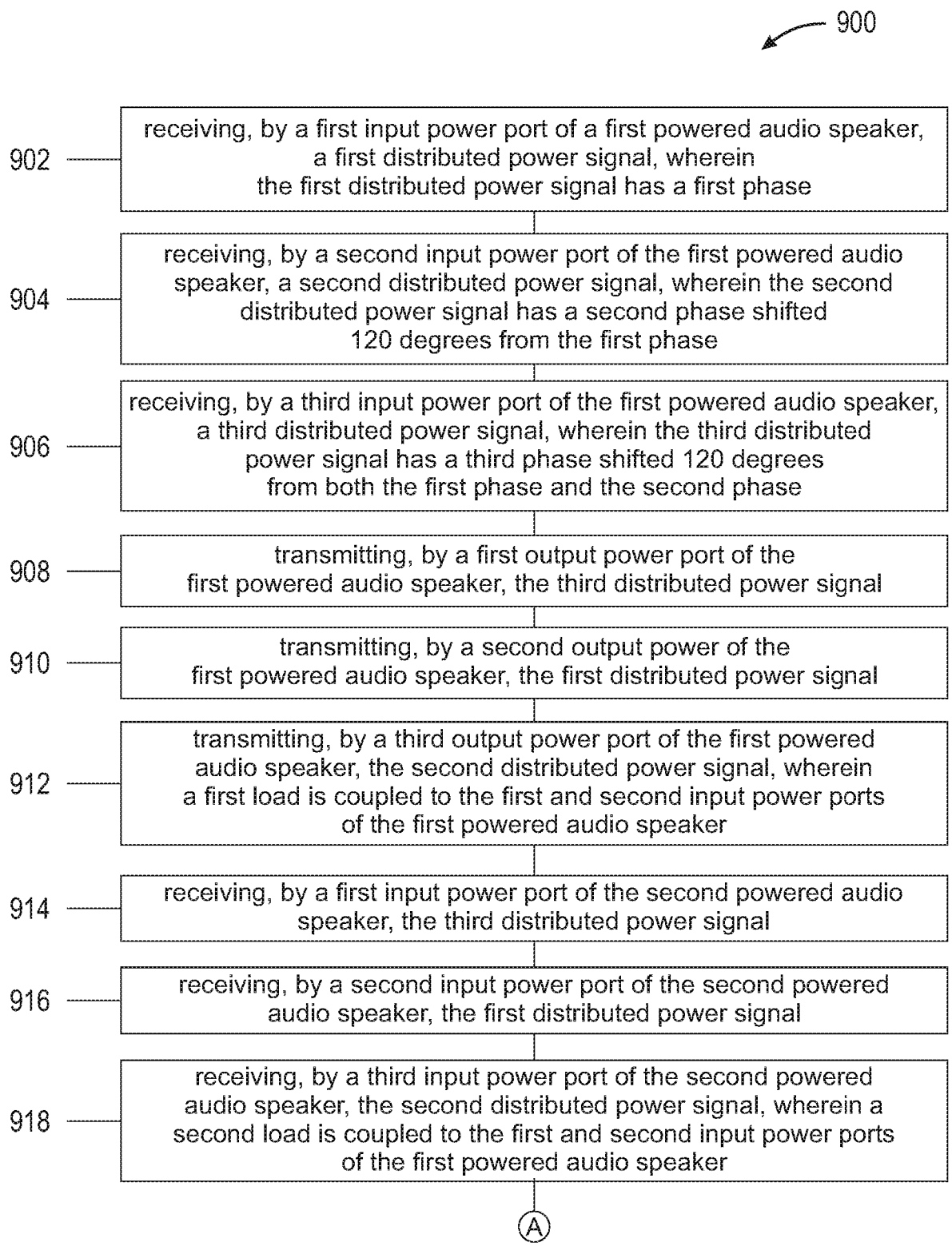
FIG. 5 is a flowchart of a power distribution method, according to an example of the present disclosure.
Figure 6:
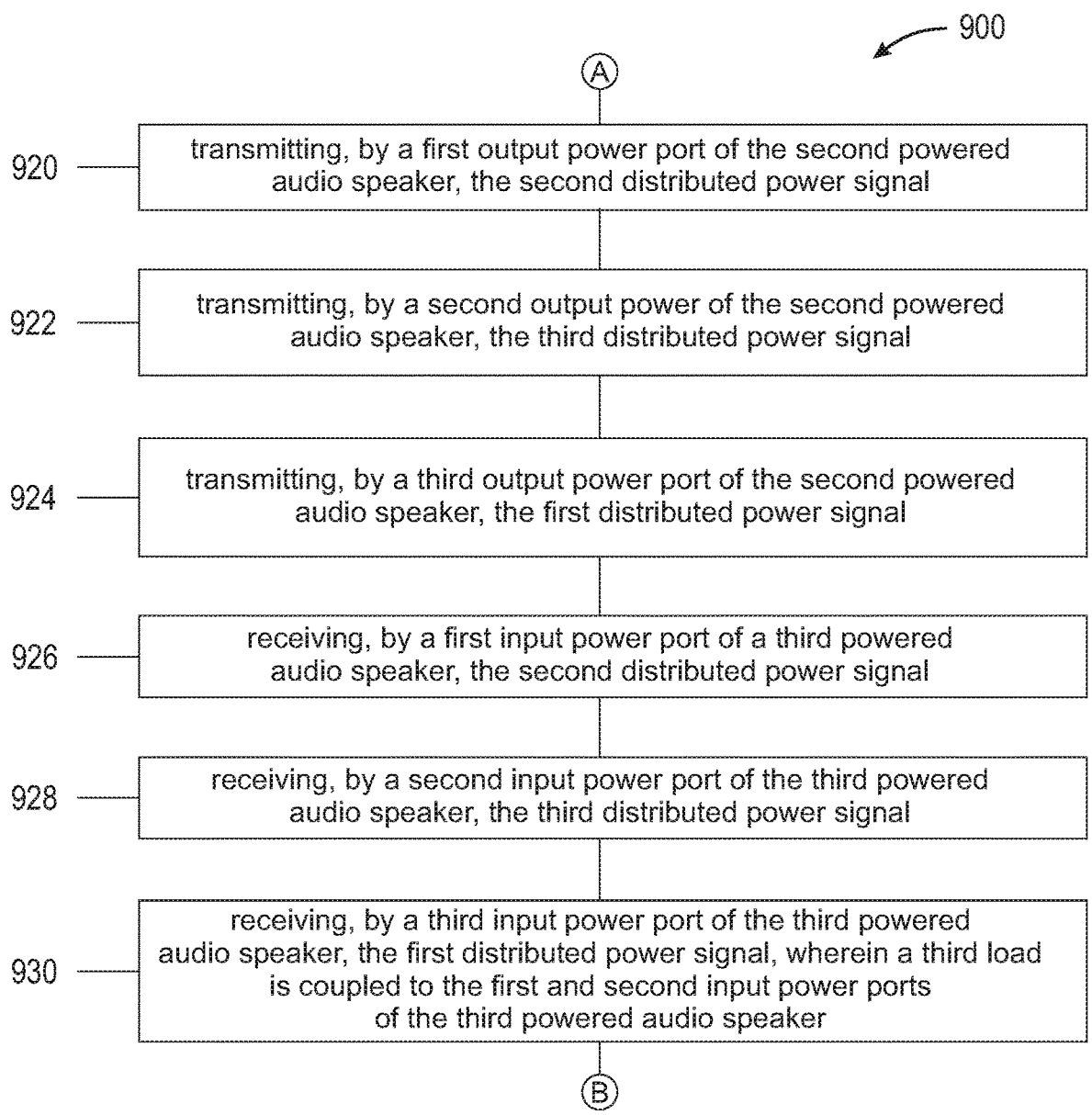
FIG. 6 is a flowchart of a power distribution method, according to an additional example of the present disclosure.
Figure 7:
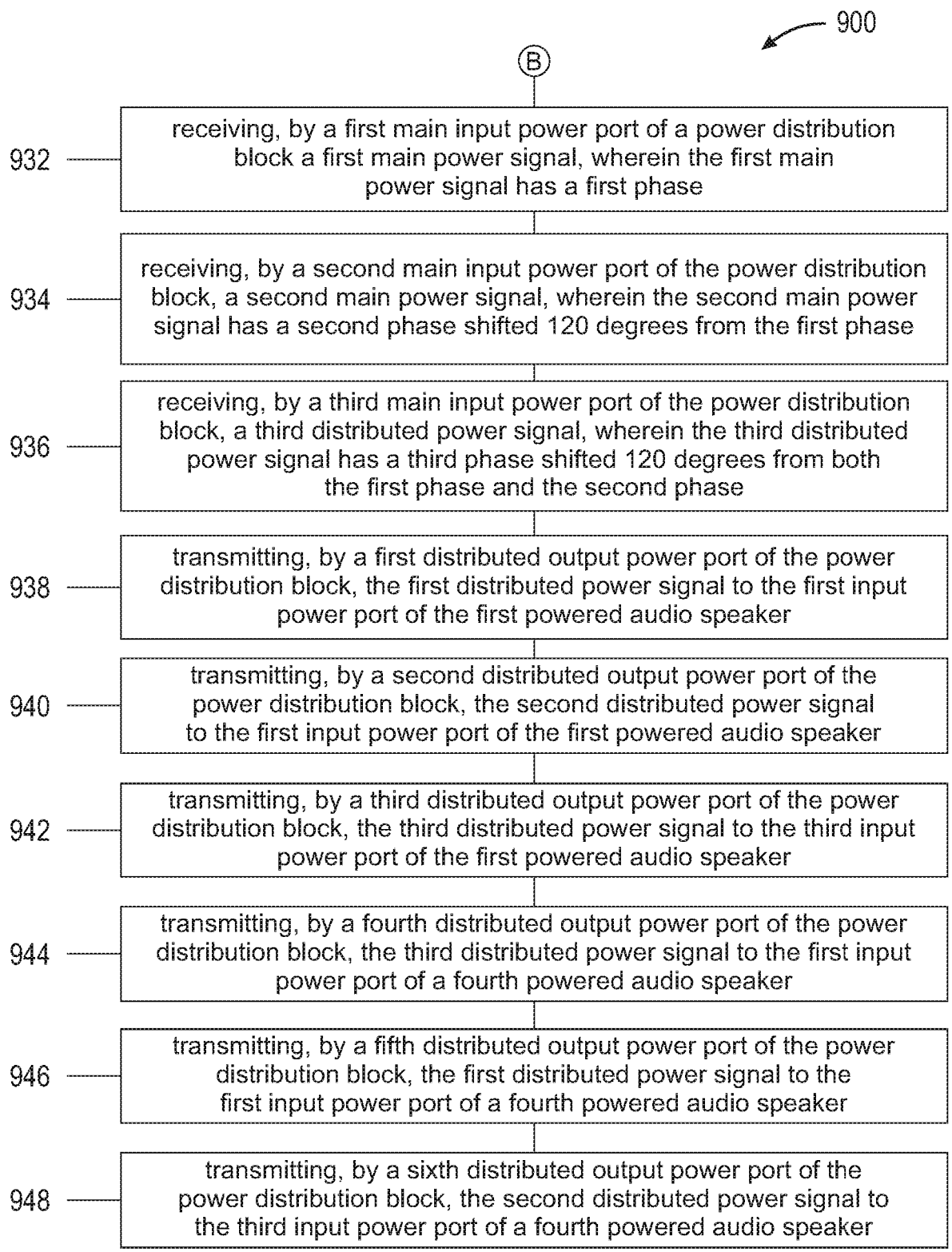
FIG. 7 is a flowchart of a power distribution method, according to an additional example of the present disclosure.

In another aspect, and with reference to FIGS. 5-7, a method 900 for power distribution is provided. The method 900 may include receiving 902, by a first input power port of a first powered audio speaker, a first distributed power signal. The first distributed power signal may have a first phase. The method 900 may include receiving 904, by a second input power port of the first powered audio speaker, a second distributed power signal. The second distributed power signal may have a second phase shifted 120 degrees from the first phase. The method 900 may further include receiving 906, by a third input power port of the first powered audio speaker, a third distributed power signal. The third distributed power signal may have a third phase shifted 120 degrees from both the first phase and the second phase.

The method 900 may further include transmitting 908, by a first output power port of the first powered audio speaker, the third distributed power signal. The method 900 may further include transmitting 910, by a second output power of the first powered audio speaker, the first distributed power signal. The method 900 may further include transmitting 912, by a third output power port of the first powered audio speaker, the second distributed power signal. A first load may be coupled to the first and second input power ports of the first powered audio speaker.

The method 900 may further include receiving 914, by a first input power port of the second powered audio speaker, the third distributed power signal. The method 900 may further include receiving 916, by a second input power port of the second powered audio speaker, the first distributed power signal. The method 900 may further include receiving 918, by a third input power port of the second powered audio speaker, the second distributed power signal. A second load may be coupled to the first and second input power ports of the first powered audio speaker.

According to an example, the method 900 may further include transmitting 920, by a first output power port of the second powered audio speaker, the second distributed power signal. The method 900 may further include transmitting 922, by a second output power of the second powered audio speaker, the third distributed power signal. The method 900 may further include transmitting 924, by a third output power port of the second powered audio speaker, the first distributed power signal.

The method 900 may further include receiving 926, by a first input power port of a third powered audio speaker, the second distributed power signal. The method 900 may further include receiving 928, by a second input power port of the third powered audio speaker, the third distributed power signal. The method 900 may further include receiving 930, by a third input power port of the third powered audio speaker, the first distributed power signal. A third load may be coupled to the first and second input power ports of the third powered audio speaker.

According to an example, the method 900 may further include receiving 932, by a first main input power port of a power distribution block a first main power signal. The first main power signal may have a first phase. The method 900 may further include receiving 934, by a second main input power port of the power distribution block, a second main power signal. The second main power signal may have a second phase shifted 120 degrees from the first phase. The method 900 may further include receiving 936, by a third main input power port of the power distribution block, a third distributed power signal. The third distributed power signal may have a third phase shifted 120 degrees from both the first phase and the second phase.

The method 900 may further include transmitting 938, by a first distributed output power port of the power distribution block, the first distributed power signal to the first input power port of the first powered audio speaker. The method 900 may further include transmitting 940, by a second distributed output power port of the power distribution block, the second distributed power signal to the first input power port of the first powered audio speaker. The method 900 may further include transmitting 942, by a third distributed output power port of the power distribution block, the third distributed power signal to the third input power port of the first powered audio speaker. The method 900 may further include transmitting 944, by a fourth distributed output power port of the power distribution block, the third distributed power signal to the first input power port of a fourth powered audio speaker. The method 900 may further include transmitting 946, by a fifth distributed output power port of the power distribution block, the first distributed power signal to the first input power port of a fourth powered audio speaker. The method 900 may further include transmitting 948, by a sixth distributed output power port of the power distribution block, the second distributed power signal to the third input power port of a fourth powered audio speaker.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of" or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The above-described examples of the described subject matter can be implemented in any of numerous ways. For example, some aspects may be implemented using hardware, software or a combination thereof. When any aspect is implemented at least in part in software, the software code can be executed on any suitable processor or collection of processors, whether provided in a single device or computer or distributed among multiple devices/computers.

The present disclosure may be implemented as a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer readable program instructions.

The computer readable program instructions may be provided to a processor of a, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various examples of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Other implementations are within the scope of the following claims and other claims to which the applicant may be entitled.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific examples described herein. It is, therefore, to be understood that the foregoing examples are presented by way of example only and that, within the scope of the appended claims and equivalents thereto, examples may be practiced otherwise than as specifically described and claimed. Examples of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method for power distribution, comprising:
   receiving, by a first input power port of a first powered audio speaker, a first distributed power signal, wherein the first distributed power signal has a first phase;
   receiving, by a second input power port of the first powered audio speaker, a second distributed power signal, wherein the second distributed power signal has a second phase shifted 120 degrees from the first phase;
   receiving, by a third input power port of the first powered audio speaker, a third distributed power signal, wherein the third distributed power signal has a third phase shifted 120 degrees from both the first phase and the second phase;
   transmitting, by a first output power port of the first powered audio speaker, the third distributed power signal;
   transmitting, by a second output power port of the first powered audio speaker, the first distributed power signal;
   transmitting, by a third output power port of the first powered audio speaker, the second distributed power signal, wherein a first load is coupled to the first and second input power ports of the first powered audio speaker;
   receiving, by a first input power port of a second powered audio speaker, the third distributed power signal;
   receiving, by a second input power port of the second powered audio speaker, the first distributed power signal; and
   receiving, by a third input power port of the second powered audio speaker, the second distributed power signal, wherein a second load is coupled to the first and second input power ports of the second powered audio speaker.

2. The method for power distribution of claim 1, further comprising:
   transmitting, by a first output power port of the second powered audio speaker, the second distributed power signal;
   transmitting, by a second output power of the second powered audio speaker, the third distributed power signal;
   transmitting, by a third output power port of the second powered audio speaker, the first distributed power signal;
   receiving, by a first input power port of a third powered audio speaker, the second distributed power signal;
   receiving, by a second input power port of the third powered audio speaker, the third distributed power signal; and
   receiving, by a third input power port of the third powered audio speaker, the first distributed power signal, wherein a third load is coupled to the first and second input power ports of the third powered audio speaker.

3. The method for power distribution of claim 2, further comprising:
   receiving, by a first main input power port of a power distribution block a first main power signal, wherein the first main power signal has a first phase;
   receiving, by a second main input power port of the power distribution block, a second main power signal, wherein the second main power signal has a second phase shifted 120 degrees from the first phase;
   receiving, by a third main input power port of the power distribution block, a third main power signal, wherein the third main power signal has a third phase shifted 120 degrees from both the first phase and the second phase;
   transmitting, by a first distributed output power port of the power distribution block, the first distributed power signal to the first input power port of the first powered audio speaker;
   transmitting, by a second distributed output power port of the power distribution block, the second distributed power signal to the first input power port of the first powered audio speaker;
   transmitting, by a third distributed output power port of the power distribution block, the third distributed power signal to the third input power port of the first powered audio speaker;
   transmitting, by a fourth distributed output power port of the power distribution block, the third distributed power signal to the first input power port of a fourth powered audio speaker;
   transmitting, by a fifth distributed output power port of the power distribution block, the first distributed power signal to the first input power port of the fourth powered audio speaker; and
   transmitting, by a sixth distributed output power port of the power distribution block, the second distributed power signal to the third input power port of the fourth powered audio speaker.

4. A power distribution system, comprising:
   a first powered audio speaker, comprising:
      a first input power port configured to receive a first distributed power signal, wherein the first distributed power signal has a first phase;
      a second input power port configured to receive a second distributed power signal, wherein the second distributed power signal has a second phase shifted 120 degrees from the first phase;
      a third input power port configured to receive a third distributed power signal, wherein the third distributed power signal has a third phase shifted 120 degrees from both the first phase and the second phase;
      a first output power port electrically coupled to the third input power port and configured to transmit the third distributed power signal;

a second output power port electrically coupled to the first input power port and configured to transmit the first distributed power signal;
a third output power port electrically coupled to the second input power port and configured to transmit the second distributed power signal; and
a first load electrically coupled to the first input power port and the second input power port; and
a second powered audio speaker, comprising:
a first input power port electrically coupled to the first output power port of the first powered audio speaker and configured to receive the third distributed power signal;
a second input power port electrically coupled to the second output power port of the first powered audio speaker and configured to receive the first distributed power signal;
a third input power port electrically coupled to the third output power port of the first powered audio speaker and configured to receive the second distributed power signal; and
a second load electrically coupled to the first input power port of the second powered audio speaker and the second input power port of the second powered audio speaker.

5. The power distribution system of claim 4, wherein the second powered audio speaker further comprises:
a first output power port electrically coupled to the third input power port of the second powered audio speaker and configured to transmit the second distributed power signal;
a second output power port electrically coupled to the first input power port of the second powered audio speaker and configured to transmit the third distributed power signal; and
a third output power port electrically coupled to the second input power port of the second powered audio speaker and configured to transmit the first distributed power signal.

6. The power distribution system of claim 5, further comprising:
a third powered audio speaker, comprising:
a first input power port electrically coupled to the first output power port of the second powered audio speaker and configured to receive the second distributed power signal;
a second input power port electrically coupled to the second output power port of the second powered audio speaker and configured to receive the third distributed power signal;
a third input power port electrically coupled to the third output power port of the second powered audio speaker and configured to receive the first distributed power signal; and
a third load electrically coupled to the first input power port of the third powered audio speaker and the second input power port of the third powered audio speaker.

7. The power distribution system of claim 6, wherein the third powered audio speaker further comprises:
a first output power port electrically coupled to the third input power port of the third powered audio speaker and configured to transmit the first distributed power signal;
a second output power port electrically coupled to the first input power port of the third powered audio speaker and configured to transmit the second distributed power signal; and
a third output power port electrically coupled to the second input power port of the third powered audio speaker and configured to transmit the third distributed power signal.

8. The power distribution system of claim 7, further comprising:
a fourth powered audio speaker, comprising:
a first input power port electrically coupled to the first output power port of the third powered audio speaker and configured to receive the first distributed power signal;
a second input power port electrically coupled to the second output power port of the third powered audio speaker and configured to receive the second distributed power signal;
a third input power port electrically coupled to the third output power port of the third powered audio speaker and configured to receive the third distributed power signal; and
a fourth load electrically coupled to the first input power port of the fourth powered audio speaker and the second input power port of the fourth powered audio speaker.

9. The power distribution system of claim 8, wherein the first powered audio speaker comprises:
an input audio port configured to receive an audio signal; and
an output audio port configured to transmit the audio signal.

10. The power distribution system of claim 9, wherein the second powered audio speaker comprises:
an input audio port coupled to the output audio port of the first powered audio speaker and configured to receive the audio signal; and
an output audio port configured to transmit the audio signal.

11. The power distribution system of claim 10, wherein the third powered audio speaker comprises:
an input audio port coupled to the output audio port of the second powered audio speaker and configured to receive the audio signal; and
an output audio port configured to transmit the audio signal.

12. The power distribution system of claim 11, wherein the fourth powered audio speaker comprises an input audio port coupled to the output audio port of the third powered audio speaker and configured to receive the audio signal.

13. The power distribution system of claim 4, wherein the first load is an audio transducer.

14. The power distribution system of claim 4, wherein the first powered audio speaker comprises:
an input ground port configured to receive a ground signal; and
an output ground port configured to transmit the ground signal.

15. The power distribution system of claim 14, wherein the second powered audio speaker comprises:
an input ground port coupled to the output ground port of the first powered audio speaker and configured to receive the ground signal; and
an output ground port configured to transmit the ground signal.

16. The power distribution system of claim 8, further comprising:
  a power distribution block configured to produce the first, second, and third distributed power signals, comprising:
    a first main input power port configured to receive a first main power signal, wherein the first main power signal has a first phase;
    a second main input power port configured to receive a second main power signal, wherein the second main power signal has a second phase shifted 120 degrees from the first phase;
    a third main input power port configured to receive a third main power signal, wherein the third main power signal has a third phase shifted 120 degrees from both the first phase and the second phase;
    a first distributed output power port electrically coupled to the first main input power port and configured to transmit the first distributed power signal to the first input power port of the first powered audio speaker;
    a second distributed output power port electrically coupled to the second main input power port and configured to transmit the second distributed power signal to the second input power port of the first powered audio speaker; and
    a third distributed output power port electrically coupled to the third main input power port and configured to transmit the third distributed power signal to the third input power port of the first powered audio speaker.

17. The power distribution system of claim 16, wherein the power distribution block further comprises:
  a fourth distributed output power port electrically coupled to the third main input power port and configured to transmit the third distributed power signal to a first input power port of a fifth powered audio speaker;
  a fifth distributed output power port electrically coupled to the first main input power port and configured to transmit the first distributed power signal to a second input power port of the fifth powered audio speaker; and
  a sixth distributed output power port electrically coupled to the second main input power port and configured to transmit the second distributed power signal to a third input power port of the fifth powered audio speaker.

18. A power distribution system, comprising:
  a first powered audio speaker, comprising:
    a first input power port configured to receive a first distributed power signal, wherein the first distributed power signal has a first phase;
    a second input power port configured to receive a second distributed power signal, wherein the second distributed power signal has a second phase shifted 120 degrees from the first phase;
    a third input power port configured to receive a third distributed power signal, wherein the third distributed power signal has a third phase shifted 120 degrees from both the first phase and the second phase;
    an input neutral port configured to receive a neutral signal;
    a first output power port electrically coupled to the third input power port and configured to transmit the third distributed power signal;
    a second output power port electrically coupled to the first input power port and configured to transmit the first distributed power signal;
    a third output power port electrically coupled to the second input power port and configured to transmit the second distributed power signal;
    an output neutral port configured to transmit the neutral signal; and
    a first load electrically coupled to the first input power port and the input neutral port; and
  a second powered audio speaker, comprising:
    a first input power port electrically coupled to the first output power port of the first powered audio speaker and configured to receive the third distributed power signal;
    a second input power port electrically coupled to the second output power port of the first powered audio speaker and configured to receive the first distributed power signal;
    a third input power port electrically coupled to the third output power port of the first powered audio speaker and configured to receive the second distributed power signal;
    an input neutral port electrically coupled to the output neutral port of the first powered audio speaker and configured to receive the neutral signal; and
    a second load electrically coupled to the first input power port of the second powered audio speaker and the input neutral port;
    a first output power port electrically coupled to the third input power port of the second powered audio speaker and configured to transmit the second distributed power signal;
    a second output power port electrically coupled to the first input power port of the second powered audio speaker and configured to transmit the third distributed power signal;
    a third output power port electrically coupled to the second input power port of the second powered audio speaker and configured to transmit the first distributed power signal; and
    an output neutral port configured to transmit the neutral signal.

19. The power distribution system of claim 18, further comprising:
  a third powered audio speaker, comprising:
    a first input power port electrically coupled to the first output power port of the second powered audio speaker and configured to receive the second distributed power signal;
    a second input power port electrically coupled to the second output power port of the second powered audio speaker and configured to receive the third distributed power signal;
    a third input power port electrically coupled to the third output power port of the second powered audio speaker and configured to receive the first distributed power signal;
    an input neutral port electrically coupled to the output neutral port of the second powered audio speaker and configured to receive the neutral signal;
    a third load electrically coupled to the first input power port of the third powered audio speaker and the input neutral port of the third powered audio speaker;
    a first output power port electrically coupled to the third input power port of the third powered audio speaker and configured to transmit the first distributed power signal;

a second output power port electrically coupled to the first input power port of the third powered audio speaker and configured to transmit the second distributed power signal;

a third output power port electrically coupled to the second input power port of the third powered audio speaker and configured to transmit the third distributed power signal; and an output neutral port configured to transmit the neutral signal.

20. The power distribution system of claim 19, further comprising:

a fourth powered audio speaker, comprising:

a first input power port electrically coupled to the first output power port of the third powered audio speaker and configured to receive the first distributed power signal;

a second input power port electrically coupled to the second output power port of the third powered audio speaker and configured to receive the second distributed power signal;

a third input power port electrically coupled to the third output power port of the third powered audio speaker and configured to receive the third distributed power signal;

an input neutral port electrically coupled to the output neutral port of the third powered audio speaker and configured to receive the neutral signal; and a fourth load electrically coupled to the first input power port of the fourth powered audio speaker and the input neutral port of the fourth powered audio speaker.

\* \* \* \* \*